United States Patent
Joe

(10) Patent No.: US 8,207,901 B2
(45) Date of Patent: Jun. 26, 2012

(54) ANTENNA FOR UNDERWATER COMMUNICATIONS

(75) Inventor: Jurianto Joe, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 395 days.

(21) Appl. No.: 12/449,236

(22) PCT Filed: Jan. 29, 2008

(86) PCT No.: PCT/SG2008/000031
§ 371 (c)(1),
(2), (4) Date: Nov. 17, 2009

(87) PCT Pub. No.: WO2008/094128
PCT Pub. Date: Aug. 7, 2008

(65) Prior Publication Data
US 2010/0060478 A1    Mar. 11, 2010

Related U.S. Application Data

(60) Provisional application No. 60/897,989, filed on Jan. 29, 2007.

(51) Int. Cl.
*H01Q 1/34* (2006.01)
(52) U.S. Cl. ........ 343/709; 343/710; 343/793; 343/815; 343/818
(58) Field of Classification Search .................. 343/709, 343/710, 815, 818, 833, 793
See application file for complete search history.

(56) References Cited

U.S. PATENT DOCUMENTS

| | | | |
|---|---|---|---|
| 3,265,972 A | 8/1966 | Curry | |
| 3,803,616 A | 4/1974 | Kopf | |
| 3,867,710 A * | 2/1975 | Busignies | 340/850 |
| 4,207,568 A | 6/1980 | MacLeod | |
| 5,307,081 A | 4/1994 | Harmuth | |
| 6,154,179 A | 11/2000 | Kohno | |
| 6,972,690 B1 | 12/2005 | Schaefer | |
| 7,202,669 B2 * | 4/2007 | Ellingsrud et al. | 324/334 |
| 7,830,318 B2 * | 11/2010 | Rhodes et al. | 343/710 |
| 2004/0008124 A1 | 1/2004 | Schaefer | |
| 2007/0135974 A1 * | 6/2007 | Fielding et al. | 700/302 |

FOREIGN PATENT DOCUMENTS

| | | |
|---|---|---|
| GB | 1253023 | 11/1961 |
| WO | WO 01/95529 | 12/2001 |

* cited by examiner

*Primary Examiner* — Dieu H Duong
(74) *Attorney, Agent, or Firm* — Leif R. Sloan; Sonya C. Harris

(57) ABSTRACT

An antenna comprises first and second radiating elements for connecting to a first and second potential levels respectively. The first and second potential levels are substantially different for generating an electrostatic field from the first and the second radiating elements. The antenna further comprises first and second field shaping structures for controlling field propagation in a first and second direction respectively. The first and second field shaping structures are interdisplaced for defining a field pathway while the first and second radiating elements are disposed adjacent to the first and second field shaping structures and along the field pathway for directing the electrostatic field in a propagation direction through a liquid medium. More specifically, the propagation direction is defined by the field pathway and substantially perpendicular to at least one of the first and second directions.

20 Claims, 5 Drawing Sheets

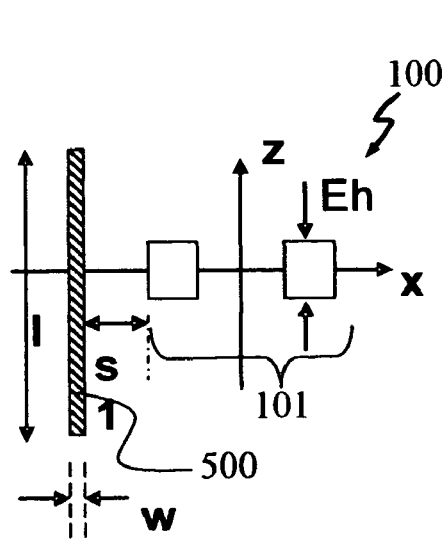
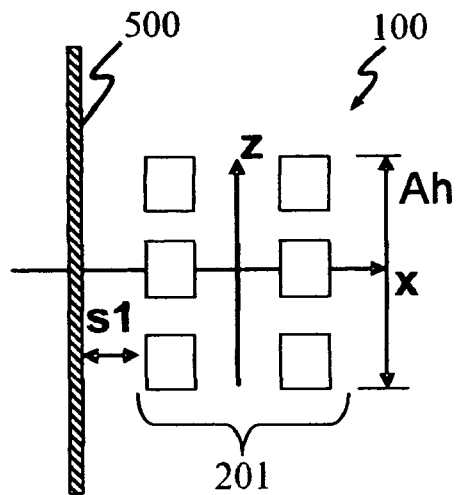
Fig. 5  Fig. 6
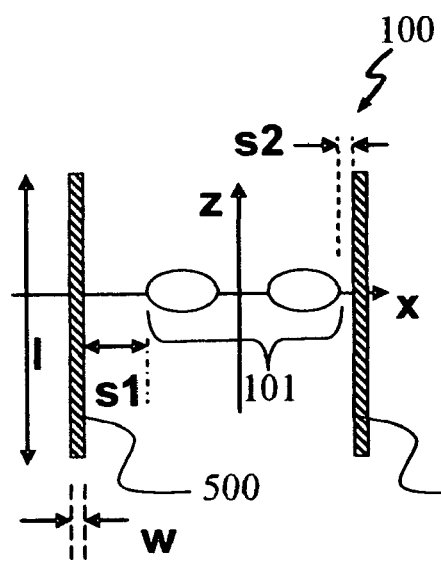
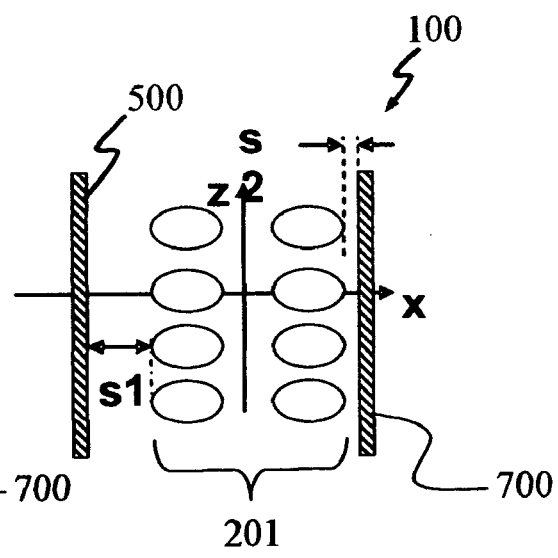
Fig. 7  Fig. 8

ANTENNA FOR UNDERWATER COMMUNICATIONS

CROSS-REFERENCE TO RELATED APPLICATION

This application claims the benefit of U.S. provisional application Ser. No. 60/897,898, filed Jan. 29, 2007 and entitled "Directive Antenna For Underwater Communications" incorporated herein by reference in its entirety.

FIELD OF INVENTION

The invention relates generally to antennas. In particular, it relates to an antenna for underwater communications.

BACKGROUND

Conventionally, underwater communications' are achieved using acoustic method. This is because the conductivity of seawater is exceedingly high for practical implementation of underwater communications using electromagnetic radiation methods.

Specifically, the high conductivity in seawater causes large attenuation in electromagnetic radiation. This results in the electromagnetic radiation incapable of propagating over long distances.

Although the acoustic method is suitable for long distance underwater communications, the bandwidth of such communications is undesirably limited. Conventional acoustic modem is capable of communicating at a rate of 40 kbps (Kilobytes per second) for up to a distance of a few hundred meters (m). The rate decreases to approximately 10 kbps for a distance greater than 5 kilometers (Km). Additionally, acoustic underwater communications is affected when it occurs close to shore or when there is noise generated by physical movements from underwater objects that are near the acoustic modem.

With the advent of Autonomous Unmanned Vehicle (AUV), there is an alternative way of transmitting large amount of the data collected via underwater sensors. Instead of sending the data over long distances, AUV is used to reach the proximity of the underwater sensors (in the order of 10 m) to collect data from the sensors. A modem with data transfer rate that is much higher than the 40 kbps achieved by the conventional acoustic modem is desirable. Hence, there is a need for an alternative modem that is capable of delivering high bit rate over a short range in an underwater environment.

Previous attempts have been made to study underwater communications by means of electromagnetic radiation. Theoretical and experimental studies of dipole antennas immersed in seawater have been proposed by M. Siegel and R. W. P. King in "Electromagnetic Propagation Between Antennas Submerged in the Ocean," IEEE Trans. Antennas Propagat., vol. 21, pp. 507-513, July 1973. However, the received signal level is undesirably low for existing communication systems.

This is especially so for existing narrowband systems as the bit rates that the systems are capable of supporting are unclear. A similar concept using a loop antenna is proposed by A. I. Al-Shamma'a, A. Shaw, and S. Saman in "Propagation of Electromagnetic Waves at MHz Frequencies Through Seawater," IEEE Trans. Antennas Propagat., vol. 52, pp. 2843-2849, Nov. 2004. The authors have proposed that the attenuation in far field propagation is much smaller due to the existence of displacement current. However, this is not verifiable, as suggested by R. Somaraju and J. Trumpf in "Electromagnetic Wave Propagation and the Permittivity of Seawater".

A method for underwater communication using electric current has been proposed by H. Momma and T. Tsuchiya in "Underwater Communication by Electric Current" IEEE OCEANS'76, pp. 24C1-24C6. This method is an alternative to the acoustic method for short-range underwater communications. The method is not affected by acoustic noise existing in underwater environment and has been shown to deliver data up to a distance of 150 m. However, the method results in high power consumption.

There is therefore a need to provide an alternative way for underwater communication that is power efficient and having an improved data transfer rate and communication range.

SUMMARY

Embodiments of the invention are disclosed hereinafter for providing an antenna that is power efficient and having an improved data transfer rate and communication range for underwater communications.

In accordance with a first embodiment of the invention, there is disclosed an antenna for underwater communications. The antenna comprises a first radiating element for connecting to a first potential level and a second radiating element for connecting to a second potential level, the first and second potential levels being substantially different for generating an electrostatic field from the first radiating element and the second radiating element. The antenna further comprises a first field shaping structure for controlling field propagation in a first direction, and a second field shaping structure for controlling field propagation in a second direction. The first and second field shaping structures are interdisplaced for defining a field pathway while the first and second radiating elements are disposed adjacent to the first and second field shaping structures and along the field pathway for directing the electrostatic field in a propagation direction through a liquid medium. More specifically, the propagation direction is defined by the field pathway and substantially perpendicular to at least one of the first and second directions.

In accordance with another embodiment of the invention, there is disclosed a method for configuring an antenna for underwater communications. The method involves coupling a first radiating element to a first potential level and a second radiating element to a second potential level, the first and second potential levels being substantially different for generating an electrostatic field from the first radiating element and the second radiating element. The method further involves providing a first field shaping structure for controlling field propagation in a first direction, and a second field shaping structure for controlling field propagation in a second direction. The first and second field shaping structures are interdisplaced for defining a field pathway while the first and second radiating elements are disposed adjacent to the first and second field shaping structures and along the field pathway for directing the electrostatic field in a propagation direction through a liquid medium. More specifically, the propagation direction is defined by the field pathway and substantially perpendicular to at least one of the first and second directions.

BRIEF DESCRIPTION OF DRAWINGS

Embodiments of the invention are described in detail hereinafter with reference to the drawings, in which:

FIGS. 5 and 6 show a first field shaping structure disposed adjacent to the antennas of FIGS. 1 and 2 respectively;

FIGS. 7 and 8 show an additional first field shaping structure disposed adjacent to a pair and an array of the electrodes respectively and opposite to the first field shaping structure;

DETAILED DESCRIPTION

Embodiments of the invention are described hereinafter with reference to the drawings for addressing the need for an antenna that is power efficient and having improved data transfer rate and communication range for underwater communications.

Figure 1:
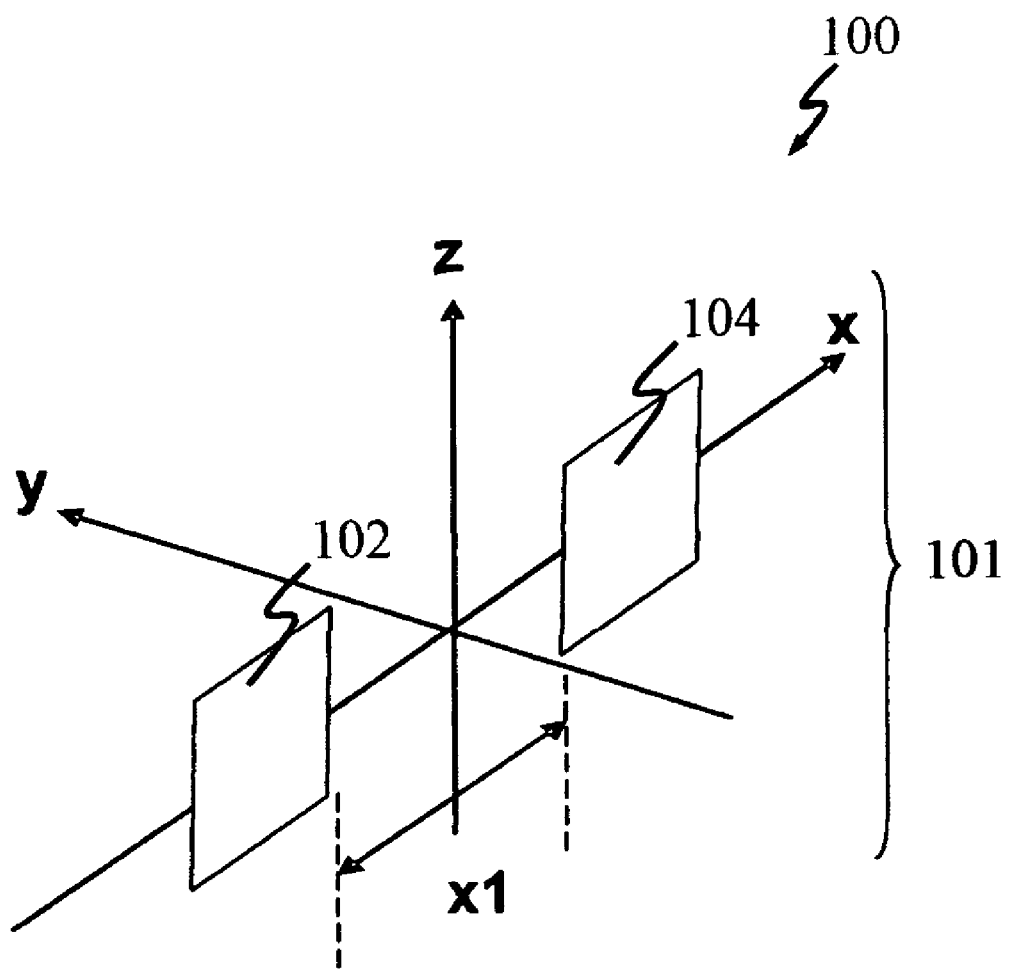
FIG. 1 is a schematic view of an antenna comprising electrodes for underwater communications according to an embodiment of the invention.

FIG. 1 shows a schematic view of an antenna 100 for underwater communications according to a first embodiment of the invention. FIG. 1 also shows a reference coordinate system that consists of an x-axis, a y-axis and a z-axis. The three axes are perpendicular to each other. The antenna 100 has a pair of electrodes 101 comprising a first radiating element 102 and a second radiating element 104. The first and second radiating elements 102, 104 are formed along the x-axis and are preferably coplanar to the x-z plane.

Each of the first and second radiating elements 102, 104 is preferably geometrically shaped as a square. Alternatively, each of the first and second radiating elements 102, 104 has a geometric shaped such as a rectangle, square, circle or oval. The first and second radiating elements 102, 104 are spaced apart by a separation x1 along the x-axis.

Electric signals are applied to the first and second radiating elements 102, 104 for signal transmission through a liquid medium, such as seawater. The first and second radiating elements 102, 104 are preferably connected to a first potential level and a second potential level respectively. The first potential level is preferably greater than the second potential level. For example, the first radiating element 102 is connected to a positive voltage while the second radiating element 104 is connected to ground. Alternatively, the electric signals are differential signals.

Communication range of the antenna 100 is dependable on the separation x1. In particular, the communication range is enhanced when the separation x1 is increased. For a given potential difference between the first and second radiating elements 102, 104, increasing the surface area of the first or second radiating element 102, 104 also improves the communication range of the antenna 100. The increase in the surface area however also increases the power consumption of the antenna 100.

Each of the first and second radiating elements 102, 104 is preferably made of copper. Conducting materials such as aluminum, gold, silver and alloys are other suitable materials for making the first and second radiating elements 102, 104.

Figures 2, 3:
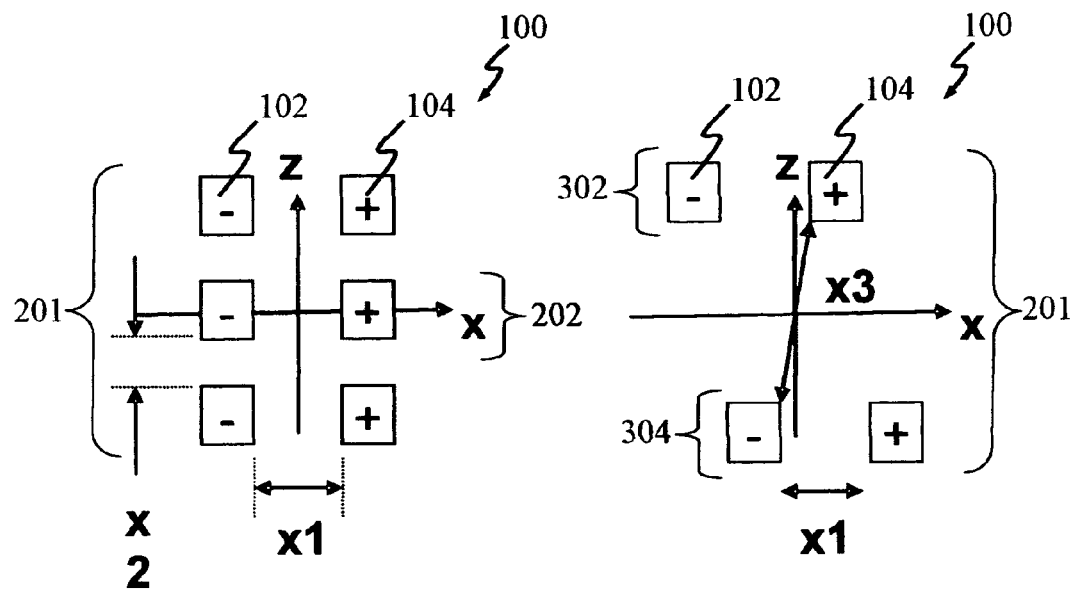
FIGS. 2 to 4 show schematic views of alternative methods for arranging an array of the electrodes of FIG. 1.
Figure 4:
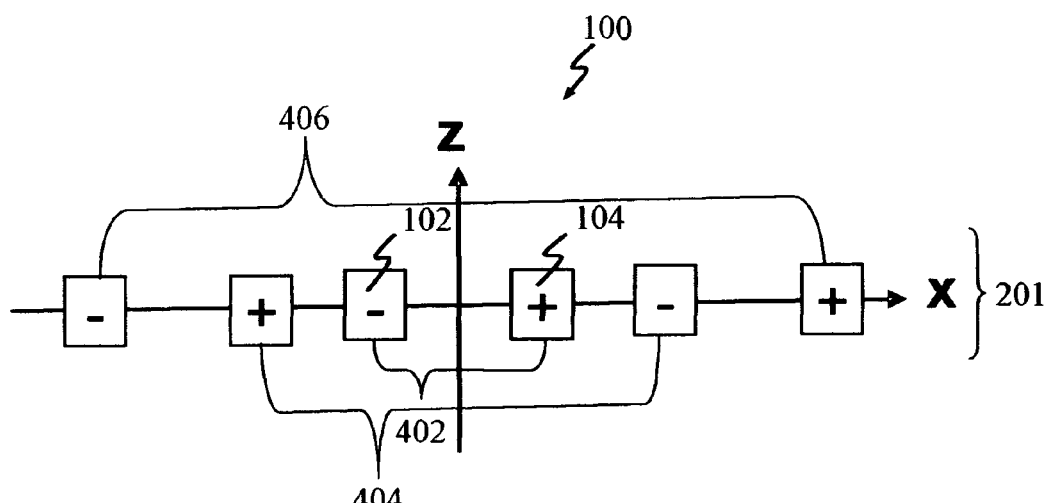

FIGS. 2 to 4 show different antenna arrangements for arranging an array of electrodes 201. The array of electrodes 201 comprises multiple pairs of electrodes 101 shown in FIG. 1 arranged spatially on the x-z plane. Each pair of electrodes 101 generates an electrostatic field that propagates along a propagation direction for generating an electric current along the propagation direction. The magnitude of the electric current is proportional to the strength of the electric field generated. Specifically, the propagation direction is along the y-axis. The positive (+) or negative (−) signs on each of the array of electrodes 201 represent positive or negative potential that is applied to the respective electrodes 101. Correct signal polarity should be applied to each of the array of electrodes 201 in order to focus the electrostatic field along the y-axis.

FIG. 2 shows three pairs of electrodes 101 arranged in a row. The three pairs of electrodes 101 are arranged substantially in line along the z-axis, with the centre pair 202 formed directly on the x-axis. Each pair of electrodes 101 is separated along the z-axis from an adjacent pair of electrodes 101 by a separation x2. Specifically, the separation x1 is preferably greater than the separation x2. For instance, the separation x1 is 10 centimeters (cm) while the separation x2 is 2.5 cm.

FIG. 3 shows two pair of the electrodes 101 arranged in a non-row and off-line arrangement. Specifically, the upper pair 302 is offset along the x-axis to the left of the z-axis while the lower pair 304 is offset along the x-axis to the right of the z-axis. Alternatively, the upper pair 302 is offset along the x-axis to the right of the z-axis while the lower pair 304 is offset along the x-axis to the left of the z-axis. The positive electrode of the upper pair 304 is separated from the negative electrode of the lower pair 304 by a separation x3. For optimal performance, the separation x1 is preferably smaller than the separation x3.

FIG. 4 shows three pairs of the electrodes 101 formed directly along the x-axis in a nesting arrangement. Specifically, a first pair 402 with the smallest separation x1 is nested in a second pair 404. The second pair 404 is in turn nested in a third pair 406. The electrode orientation of the first pair is a mirror of the second and third pairs 404, 406.

The use of directive antenna enhances communication range in air. This concept is applicable to underwater communications through electric conduction. By using a principle method of in-phase image, radiation generated by the electrodes is enhanced. This is achieved by forming minors or field shaping structures adjacent to the antenna 100 of FIG. 1.

With reference to FIG. 5, a first field shaping structure 500 is formed on the y-z plane. The first field shaping structure 500 is preferably made of aluminum. Alternatively, the first field shaping structure 500 is made of other conductive materials such as copper, gold or alloys. The electrostatic field generated by the first and second radiating elements 102, 104 of the antenna 100 of FIG. 1 is thereby focused along the y-axis.

The first field shaping structure 500 has a length l, thickness w and height (not shown). The length l is preferably several times greater than the length Eh of each of the first and second radiating elements 102, 104 for effective focusing of the electrostatic field along the y-axis. The thickness w is preferably a few millimeters (mm), for example 2 mm. The communication range of the antenna 100 is proportional to the height of the first field shaping structure 500. Exemplary dimensions for the length l and height are 30 cm and 50 cm respectively.

The first field shaping structure 500 is spatially separated from the first radiating element 102 by a separation s1 in an arrangement where the first radiating element 102 is proximal to the first field shaping structure 500 and the second radiating element 104 is distal thereto. The separation s1 is preferably as small as possible but the first field shaping structure 500 and the first radiating element 102 should not be contacting each other. For example, the separation s1 is approximately 5 cm.

FIG. 6 shows the first field shaping structure 500 formed adjacent to the array of electrodes 201 of FIG. 2 in an arrangement similar to that of FIG. 5, where the first radiating element 102 is proximal to the first field shaping structure 500 and the second radiating element 104 is distal thereto. The array of electrodes 201 enhances the communication range of the antenna 100 along the y-axis. The array of electrodes 201 has an array height Ah. Specifically, the length l of the first field shaping structure 500 is preferably greater than the array height Ah.

Each of FIGS. 7 and 8 shows an additional first field shaping structure 700 formed opposite and substantially parallel to the first field shaping structure 500 on the y-z plane. The additional first field shaping structure 700 further enhances focusing of the electrostatic field along the y-axis. The additional first field shaping structure 700 is separated from the second radiating element 104 by a separation s2. Specifically, the second radiating element 104 is proximal to the additional first field shaping structure 700 and the first radiating element 102 is distal thereto. The separation s2 is preferably as small as possible but the additional first field shaping structure 700 and the second radiating element 104 should not be contacting each other. For example, the separation s2 is approximately 5 cm.

Figure 9:
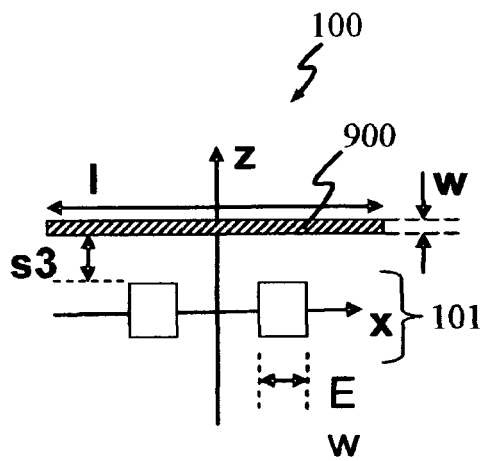
FIGS. 9 and 10 show a second field shaping structure disposed adjacent to one and two pairs of the electrodes of FIG. 1 respectively.

With reference to FIG. 9, a second field shaping structure 900 is formed on the x-y plane. The second field shaping structure 900 also enhances the electrostatic field along the y-axis. At the same time, the electrostatic field in the space on the opposite side of the second field shaping structure 900 is reduced. This is because the second field shaping structure 900 impedes propagation of the electrostatic field.

The second field shaping structure 900 is preferably made of perspex. Alternatively, the second field shaping structure 900 is made of other insulating or non-conductive materials such as fiberglass, plastics or air.

The second field shaping structure 900 has a length l, thickness w and height (not shown). The length l is preferably several times greater than the width Ew of each of the first and second radiating elements 102, 104 for effective focusing of the electrostatic field along the y-axis. The thickness w is preferably a few mm, for example 5 mm. The communication range of the antenna 100 is proportional to the height of the second field shaping structure 900. Exemplary dimensions for the length l and height are 60 cm and 50 cm respectively.

The second field shaping structure 900 is separated from the first and second radiating elements 102, 104 by a separation s3. Specifically, the first and second radiating elements 102, 104 are equally separated from the second field shaping structure 900 by the separation s3. The separation s3 is preferably as small as possible. For example, the separation s3 is approximately 10 cm.

Figure 10:
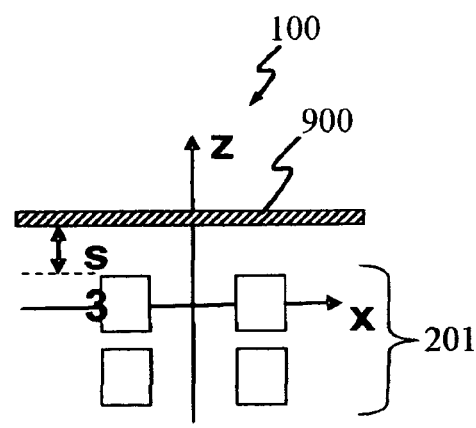

FIG. 10 shows two pairs of electrodes 101 formed adjacent to the second field shaping structure 900. The two pairs of electrodes 101 enhance the communication range of the antenna 100 along the y-axis.

Figure 11:
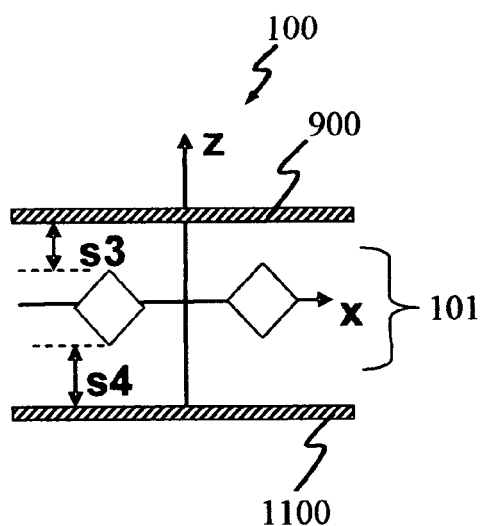
FIGS. 11 and 12 show an additional second field shaping structure disposed adjacent to one and three pairs of the electrodes of FIG. 1 respectively and opposite to the second field shaping structure.
Figure 12:
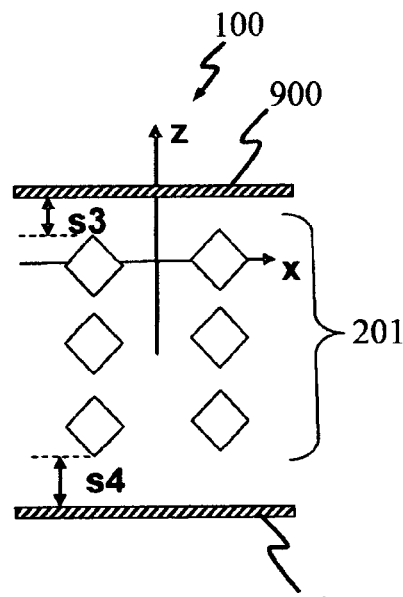

FIGS. 11 and 12 show an additional second field shaping structure 1100 formed opposite and substantially parallel to the second field shaping structure 900 on the x-y plane. The additional second field shaping structure 1100 further enhances focusing of the electrostatic field along the y-axis. The additional second field shaping structure 1100 is separated from the first and second radiating elements 102, 104 by a separation s4. Specifically, the first and second radiating elements 102, 104 are equally separated from the additional second field shaping structure 900 by the separation s4. The separation s4 is preferably as small as possible. For example, the separation s4 is approximately 10 cm.

Figure 13:
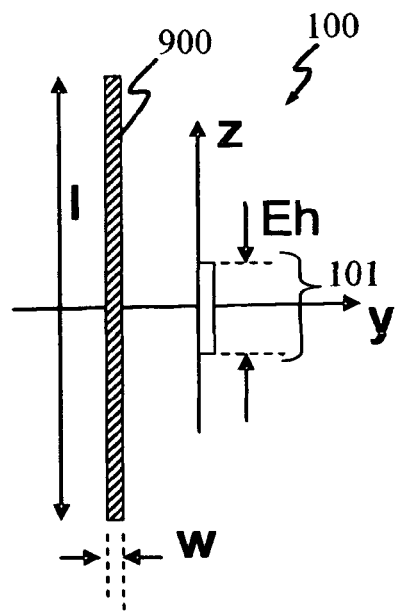
FIGS. 13 and 14 show the electrodes of FIG. 1 formed adjacent to and directly on the second field shaping structure of FIG. 9.
Figure 14:
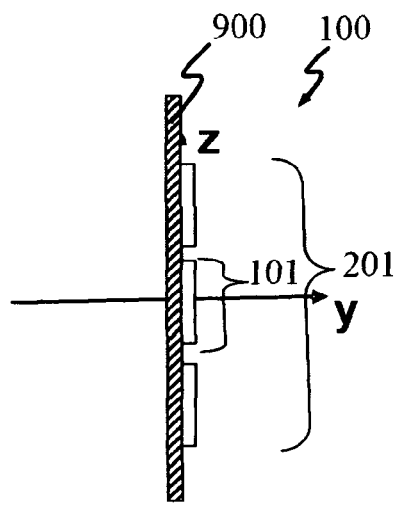

FIGS. 13 and 14 show the electrodes 101 formed adjacent to the second field shaping structure 900 of FIG. 9. In particular, the direction of propagation is along the positive y-axis when the electrodes 101 are formed directly on the second field shaping structure 900, as shown in FIG. 14. In this case, there are no separation between the electrodes 101 and the second field shaping structure 900.

Figure 15:
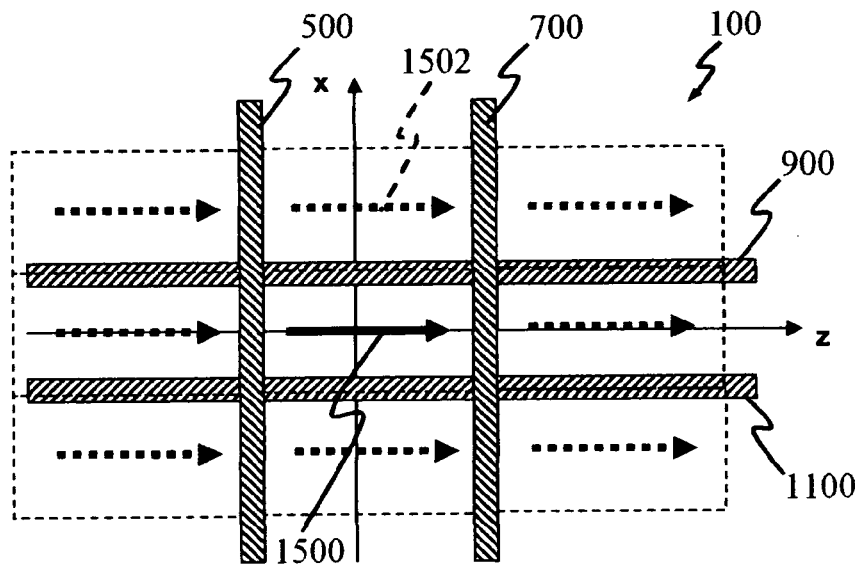
FIG. 15 shows a schematic plan view of the first and second field shaping structures and the additional first and second field shaping structures according to another embodiment of the invention.

FIG. 15 shows a schematic plan view of the first and second field shaping structures 500, 900 as well as the additional first and second field shaping structures 700, 1100, according to another embodiment of the invention. In particular, the first field shaping structure 500 is substantially parallel to the additional first field shaping structure 700 and is disposed along the x-axis. Similarly, the second field shaping structure 900 is substantially parallel to the additional second field shaping structure 1100 and is disposed along the z-axis.

The pair of electrodes 101 is modeled as an electric current element 1500 represented by a solid arrow. The electric current element 1500 is mirrored about the first field shaping structure 500 and the additional first field shaping structure 700 as well as the second field shaping structure 900 and the additional second field shaping structure 1100. Dashed arrows represent the mirrored or virtual electric current elements 1502 that are in-phase with the electric current element 1500, as shown in FIG. 15.

The first field shaping structure 500 and the second field shaping structure 900, together with the additional first field shaping structure 700 and the additional second field shaping structure 1100 advantageously define a field pathway to provide directivity of the electrostatic field along the y-axis. This allows the communication range of the antenna 100 to be enhanced without increasing power consumption.

In the foregoing manner, an antenna for providing underwater communications that is power efficient and having improved data transfer rate and communication range is disclosed. Although only a number of embodiments of the invention are disclosed, it becomes apparent to one skilled in the art in view of this disclosure that numerous changes and/or modification can be made without departing from the scope and spirit of the invention.

The invention claimed is:

1. An antenna for underwater communications, the antenna comprising:
   a first radiating element for connecting to a first potential level;
   a second radiating element for connecting to a second potential level, the first and second potential levels being substantially different for generating an electrostatic field from the first radiating element and the second radiating element;
   a first field shaping structure for controlling field propagation in a first direction; and
   a second field shaping structure for controlling field propagation in a second direction, the first and second field shaping structures being interdisplaced for defining a field pathway, the first and second radiating elements being disposed adjacent to the first and second field shaping structures and along the field pathway for directing the electrostatic field in a propagation direction through a liquid medium, wherein the propagation direction is defined by the field pathway and substantially perpendicular to at least one of the first and second directions.

2. The antenna as in claim 1, the first field shaping structure further for mirroring a mirrored field from the electrostatic field, the mirrored field being directed in a propagation direction when the electrostatic field is directed in the propagation direction.

3. The antenna as in claim 1, wherein the first field shaping structure is substantially perpendicular to the second field shaping structure.

4. The antenna as in claim 1, wherein the first and second radiating elements are disposed substantially perpendicular to the propagation direction.

5. The antenna as in claim 1, wherein the first and second radiating elements are substantially coplanar.

6. The antenna as in claim 1, wherein the first and second radiating elements are spaced apart.

7. The antenna as in claim 1, wherein each of the first and second field shaping structures is dimensionally larger than the first and second radiating elements.

8. The antenna as in claim 1, wherein the first radiating element is spatially closer to the first field shaping structure than the second radiating element.

9. The antenna as in claim 1, wherein the first radiating element is disposed on the second field shaping structure.

10. The antenna as in claim 1, further comprising:
a third field shaping structure and a fourth field shaping structure, wherein the third mirror and fourth mirror substantially oppose the first and second field shaping structures respectively.

11. A method for configuring an antenna for underwater communications, the method comprising the steps of:
coupling a first radiating element to a first potential level;
coupling a second radiating element to a second potential level, the first and second potential levels being substantially different for generating an electrostatic field from the first radiating element and the second radiating element;
providing a first field shaping structure for controlling field propagation in a first direction; and
providing a second field shaping structure for controlling field propagation in a second direction, the first and second field shaping structures being interdisplaced for defining a field pathway, the first and second radiating elements being disposed adjacent to the first and second field shaping structures and along the field pathway for directing the electrostatic field in a propagation direction through a liquid medium, wherein the propagation direction is defined by the field pathway and substantially perpendicular to at least one of the first and second directions.

12. The method as in claim 11, the first field shaping structure further for mirroring a mirrored field from the electrostatic field, the mirrored field being directed in a propagation direction when the electrostatic field is directed in the propagation direction.

13. The method as in claim 11, wherein the first field shaping structure is substantially perpendicular to the second field shaping structure.

14. The method as in claim 11, wherein the first and second radiating elements are disposed substantially perpendicular to the propagation direction.

15. The method as in claim 13, wherein the first and second radiating elements are substantially coplanar.

16. The method as in claim 11, wherein the first and second radiating elements are spaced apart.

17. The method as in claim 11, wherein each of the first and second field shaping structures is dimensionally larger than the first and second radiating elements.

18. The method as in claim 11, wherein the first radiating element is spatially closer to the first field shaping structure than the second radiating element.

19. The method as in claim 11, wherein the first radiating element is disposed on the second field shaping structure.

20. The method as in claim 11, further comprising the step of:
providing a third field shaping structure and a fourth field shaping structure, wherein the third mirror and fourth mirror substantially oppose the first and second field shaping structures respectively.

* * * * *